(12) United States Patent
Baldo et al.

(10) Patent No.: US 7,928,960 B2
(45) Date of Patent: Apr. 19, 2011

(54) ANALOG INPUT DEVICE WITH INTEGRATED PRESSURE SENSOR AND ELECTRONIC APPARATUS EQUIPPED WITH SAID INPUT DEVICE

(75) Inventors: Lorenzo Baldo, Bareggio (IT); Chantal Combi, Oggiono (IT); Dino Faralli, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1223 days.

(21) Appl. No.: 11/530,170

(22) Filed: Sep. 8, 2006

(65) Prior Publication Data
US 2007/0068779 A1    Mar. 29, 2007

(30) Foreign Application Priority Data
Sep. 9, 2005 (EP) .................................. 05425633

(51) Int. Cl.
*G09G 5/00* (2006.01)
(52) U.S. Cl. ........ 345/156; 345/160; 345/161; 345/169; 73/715; 73/717; 73/754
(58) Field of Classification Search .................. 345/156, 345/173; 73/715, 717
See application file for complete search history.

(56) References Cited

U.S. PATENT DOCUMENTS

| | | | |
|---|---|---|---|
| 4,276,533 A * | 6/1981 | Tominaga et al. ................. 338/4 |
| 4,445,383 A | 5/1984 | Binder et al. |
| 4,823,605 A * | 4/1989 | Stein ............................... 73/727 |
| 5,090,247 A * | 2/1992 | Liebgen ........................... 73/727 |
| 5,596,219 A | 1/1997 | Hierold |
| 5,661,245 A * | 8/1997 | Svoboda et al. ................. 73/726 |
| 5,830,372 A | 11/1998 | Hierold |
| 5,844,287 A | 12/1998 | Hassan et al. |
| 6,115,030 A | 9/2000 | Berstis et al. |
| 6,195,082 B1 | 2/2001 | May et al. |
| 6,472,244 B1 * | 10/2002 | Ferrari et al. .................... 438/53 |
| 6,504,253 B2 | 1/2003 | Mastromatteo et al. |
| 6,546,799 B1 | 4/2003 | Vigna et al. |
| 6,627,965 B1 | 9/2003 | Tuller et al. |

(Continued)

FOREIGN PATENT DOCUMENTS

EP       1069419 A2     1/2001

(Continued)

OTHER PUBLICATIONS

Dow Corning Electronics Solutions, "Information About Dow Corning® Brand Dielectric Gels," Product Information, ©2002, 2003, 2004, 8 pages.

(Continued)

*Primary Examiner* — Alexander Eisen
*Assistant Examiner* — Viet Pham
(74) *Attorney, Agent, or Firm* — Lisa K. Jorgenson; Timothy L. Boller; Seed IP Law Group PLLC

(57) ABSTRACT

In an input device, a control element is operated by a user; a pressure sensor is mechanically coupled to the control element and is provided with a monolithic body of semiconductor material housing a first sensitive element, which detects an actuation of the control element; a supporting element is connected to the pressure sensor; and connection elements electrically connect the monolithic body to the supporting element without interposition of a package. In particular, the monolithic body has electrical-contact areas carried by one main surface thereof, and the printed circuit board has conductive regions carried by a main face thereof; the connection elements are conductive bumps and electrically connect the electrical-contact areas to the conductive regions.

34 Claims, 2 Drawing Sheets

U.S. PATENT DOCUMENTS

| | | |
|---|---|---|
| 6,640,642 B1 | 11/2003 | Onose et al. |
| 6,838,362 B2 | 1/2005 | Mastromatteo et al. |
| 6,945,115 B1 | 9/2005 | Wang |
| 7,352,356 B2 | 4/2008 | Roberts et al. |
| 7,474,296 B2 | 1/2009 | Obermeyer et al. |
| 2002/0006682 A1* | 1/2002 | Benzel et al. ............ 438/50 |
| 2002/0137348 A1 | 9/2002 | Mlcak |
| 2002/0143484 A1 | 10/2002 | Chiesa |
| 2003/0119220 A1 | 6/2003 | Mlcak et al. |
| 2003/0168711 A1 | 9/2003 | Villa et al. |
| 2003/0205090 A1* | 11/2003 | Jakobsen .................. 73/718 |
| 2004/0007750 A1 | 1/2004 | Anderson et al. |
| 2004/0079159 A1* | 4/2004 | Muchow .................... 73/716 |
| 2004/0103724 A1* | 6/2004 | Takizawa et al. .......... 73/754 |
| 2004/0224482 A1 | 11/2004 | Kub et al. |
| 2004/0237658 A1* | 12/2004 | Ohms et al. ............... 73/718 |
| 2004/0237661 A1 | 12/2004 | Yang |
| 2004/0238821 A1 | 12/2004 | Yang |
| 2004/0251906 A1 | 12/2004 | Staple et al. |
| 2005/0000292 A1 | 1/2005 | Muchow et al. |
| 2005/0132815 A1 | 6/2005 | Claude et al. |
| 2005/0199971 A1 | 9/2005 | Anderson et al. |
| 2005/0208696 A1* | 9/2005 | Villa et al. ................. 438/53 |
| 2005/0219220 A1 | 10/2005 | Kishi et al. |
| 2005/0252301 A1* | 11/2005 | Dietrich .................... 73/717 |
| 2006/0082463 A1 | 4/2006 | Sri-Jayantha et al. |
| 2006/0262088 A1 | 11/2006 | Baldo et al. |
| 2008/0013102 A1 | 1/2008 | Berger et al. |

FOREIGN PATENT DOCUMENTS

| | | |
|---|---|---|
| EP | 1324382 A1 | 7/2003 |
| EP | 1378736 A1 | 1/2004 |
| JP | 62059825 | 3/1987 |
| JP | 2001174350 A | 6/2001 |
| WO | 9825115 A1 | 6/1998 |

OTHER PUBLICATIONS

Sugiyama, S. et al., "A 32×32 (1K)-Element Silicon Pressure-Sensor Array with CMOS Processing Circuits," Electronics and Communications in Japan, 75(1):64-75, Jan. 1992.

* cited by examiner

ANALOG INPUT DEVICE WITH INTEGRATED PRESSURE SENSOR AND ELECTRONIC APPARATUS EQUIPPED WITH SAID INPUT DEVICE

BACKGROUND OF THE INVENTION

1. Field of the Invention

The present invention relates to an analog input device with an integrated pressure sensor, and to an electronic apparatus equipped with said input device, such as, for example, a mobile phone, to which the following description will make explicit reference without this, however, implying any loss of generality.

2. Description of the Related Art

As is known, latest-generation mobile phones provide a plurality of advanced functions, such as, for example, e-mail management, internet browsing, display of electronic documents, acquisition and display of images, in addition to "standard" functions, such as, for example, management of address books, phone calls, and text messages. Graphic user interfaces (GUIs) enable simple and effective control of the various functions, by means of particular input devices (known as Trackpoint™) arranged in the mobile phones. Such input devices enable simple input of data and/or commands; for example, they make it possible to scroll lists, make selections, move a cursor displayed on the screen, or, more in general, generate actions within the graphic interface.

Input devices are known which comprise: a control element that can be actuated by a user; a sensor, mechanically coupled to the control element for detecting its actuation and generating corresponding electrical signals; and an electronic detection circuit, which receives and processes said electrical signals in order to determine the datum/command entered by the user and transmit it to an electronic control circuit of the mobile phone, which will generate a corresponding action within the graphic interface (for example, displacement of the cursor, or scrolling of a list).

BRIEF SUMMARY OF THE INVENTION

One embodiment of the invention provides an input device wherein a more efficient assembly is provided between a corresponding pressure sensor and a printed circuit board. One embodiment of the invention is an input device, comprising a control element which can be actuated by a user. A pressure sensor is mechanically coupled to the control element and provided with a monolithic body of semiconductor material housing a first sensitive element configured to detect an actuation of said control element. A supporting element is connected to the monolithic body. Connection elements are provided for connecting the monolithic body to the supporting element. The connection elements connect the monolithic body to the supporting element without interposition of a package.

One embodiment of the invention is a process for manufacturing an input device provided with a control element that can be actuated by a user and with a supporting element. The process comprises forming in a monolithic body of semiconductor material a first sensitive element configured to detect an actuation of the control element, mechanically coupling the monolithic body to the control element, and connecting said monolithic body to said supporting element. The step of connecting the monolithic body to the supporting element includes connecting the monolithic body to the supporting element without interposition of a package.

One embodiment of the invention is an electronic apparatus comprising an input device that has a control element that can be actuated by a user. A pressure sensor is mechanically coupled to the control element and is provided with a monolithic body of semiconductor material housing a first sensitive element configured to detect an actuation of the control element. A supporting element is connected to the monolithic body. Connection elements are provided for connecting the monolithic body to the supporting element. The connection elements connect the monolithic body to the supporting element without interposition of a package.

BRIEF DESCRIPTION OF THE SEVERAL VIEWS OF THE DRAWINGS

For a better understanding of the present invention, there are now described preferred embodiments thereof, purely by way of non-limiting example and with reference to the attached drawings, wherein.

DETAILED DESCRIPTION OF THE INVENTION

Figure 1:
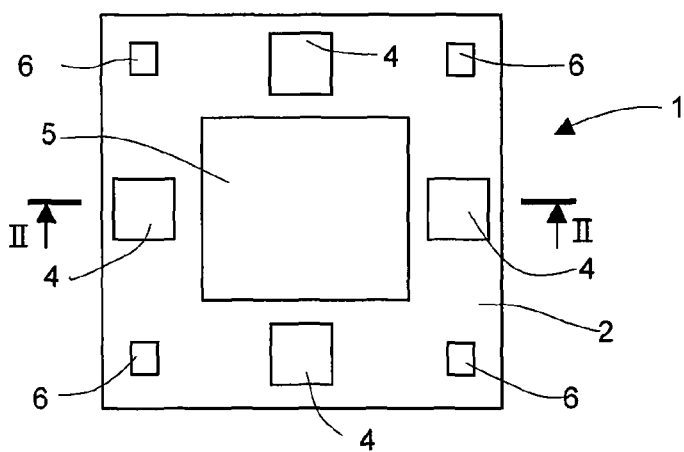
FIG. 1 is a schematic top plan view of a monolithic body of semiconductor material of an integrated pressure sensor belonging to an input device.

An analog input device including an integrated pressure sensor of a micro-electromechanical type is described in U.S. patent application Ser. No. 11/393,377, filed on Mar. 30, 2006, assigned to STMicroelectronics Srl, the assignee of the present application, and incorporated herein by reference.

In detail (see FIGS. 1-2), the pressure sensor, designated by 1, comprises a monolithic body 2 made of semiconductor material (for example, silicon) having a first and a second main outer surfaces 2a, 2b, which are opposite to one another. Sensitive elements 4, in particular of a micro-electromechanical type, and an electronic interface circuit 5, connected to the sensitive elements 4, are formed in the monolithic body 2. The monolithic body 2 has a cross section that is, for example, square, with sides l of 5 mm, and its thickness is, for example, 400µm. Connection pads 6, made of conductive material, are provided on the first main outer surface 2a of the monolithic body 2 for electrical connection of the sensitive elements 4 to the electronic detection circuit (not shown) of the input device. The sensitive elements 4 are arranged in a way corresponding to the directions of actuation of the control element (not illustrated) of the input device; for example, they are arranged to form a cross, in the case where the directions of actuation are four mutually orthogonal (corresponding, for example, to the displacement directions "North", "South", "East", "West" within the graphic interface). Accordingly, each sensitive element 4 preferentially detects actuation of the control element in a corresponding direction, and it supplies a maximum output when the control element is actuated in that direction. The electronic interface circuit 5 is formed in a region of the monolithic body 2 not occupied by sensitive elements 4; for example, it is formed in a central position with respect to the sensitive elements 4.

In detail (see FIG. 2), each sensitive element 4 comprises: a buried cavity 8, having sides of, for example, 500μm, which is arranged, and completely contained and insulated, within the monolithic body 2; a diaphragm 9, which is suspended above the buried cavity 8 and is flexible and deformable in the presence of external stresses; and piezoresistive elements 10, formed in a surface portion of the diaphragm 9. In detail, the piezoresistive elements 10 are formed by diffusion or implantation of dopant atoms and are connected together to form Wheatstone-bridge circuits (one for each sensitive element 4), the outputs of which are connected to the electronic interface circuit 5.

The manufacturing process of the pressure sensor 1 is based upon the process described in U.S. Published Patent Application 2003/168711 for making a SOI wafer, and upon the process described in U.S. Published Patent Application No. 2005/0208696, for making a pressure sensor, both of which are assigned to STMicroelectronics Srl and incorporated herein by reference.

In brief, in an initial step, a resist mask is formed on top of a wafer of semiconductor material, in particular silicon, comprising a substrate. The mask has areas of an approximately square shape each comprising a plurality of hexagonal mask portions, which define a honeycomb lattice. In particular, the number of areas of the mask corresponds to the number of sensitive elements that it is desired to form, and their arrangement on the wafer corresponds to the desired arrangement of the sensitive elements. Next, using the mask, an anisotropic chemical etching of the substrate is performed, which leads to the formation of trenches, communicating with one another and delimiting a plurality of silicon pillars. In practice, the trenches form an open region with a complex shape (corresponding to the honeycomb lattice of the mask), wherein the pillars extend (having a shape corresponding to the mask portions). Then, the mask is removed and an epitaxial growth is carried out in a de-oxidizing atmosphere (typically, in an atmosphere with high hydrogen concentration, preferably with trichlorosilane—$SiHCl_3$). Consequently, an epitaxial layer grows on top of the pillars and closes the open region at the top. Next, a step of thermal annealing is carried out, for example, for 30 minutes at 1190° C., preferably in a hydrogen atmosphere, or, alternatively, in a nitrogen atmosphere. As discussed in the aforementioned patent applications, the annealing step causes a migration of the silicon atoms, which tend to move into the position of lower energy. Consequently, and also due to the small distance between the pillars, the silicon atoms migrate completely from the portions of the pillars within the open region so that the buried cavities 8 are formed. Remaining on top of each buried cavity 8 is a thin silicon layer, constituted in part by silicon atoms grown epitaxially and in part by silicon atoms that have migrated, said layer forming the diaphragms 9. At the end of this step, as many diaphragms 9 and as many buried cavities 8 are thus formed, as are the areas of the previously defined mask.

Figure 2:
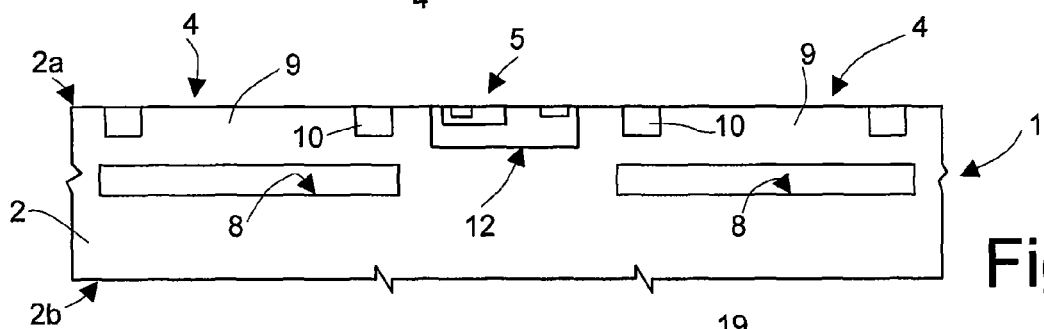
FIG. 2 is a cross-sectional view of the monolithic body of FIG. 1, taken along the line of section II-II of FIG. 1.

The electronic interface circuit 5 (FIG. 2 shows, by way of example, just one bipolar transistor 12) is made using manufacturing steps that are common to the manufacturing process of the sensitive elements 4. In particular, the electronic interface circuit 5 is connected to the outputs of the Wheatstone-bridge circuits formed by the piezoresistive elements 10 of the various sensitive elements 4, and comprises an amplifier stage, including at least an instrumentation amplifier, configured to acquire the output signals of the Wheatstone-bridge circuits, and possibly one or more filtering stages. Conveniently, the electronic interface circuit 5 further comprises an analog-to-digital converter (ADC) stage. In a way not illustrated, electrical insulation regions can be provided for electrically insulating the electronic interface circuit 5 from the sensitive elements 4.

Figure 3:
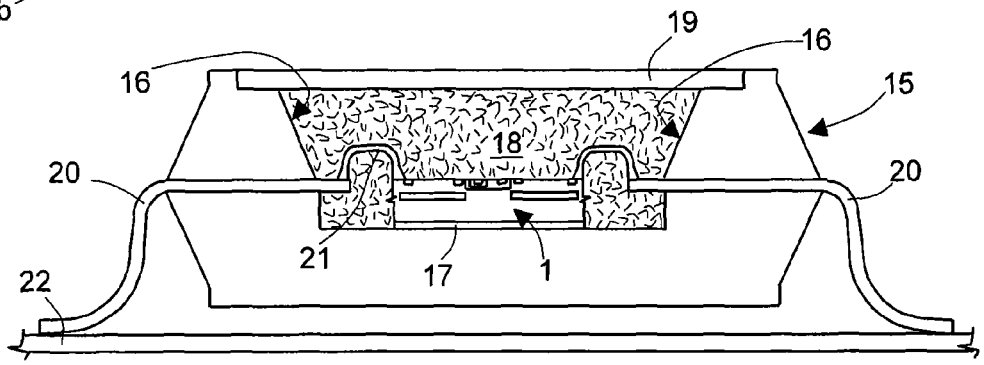
FIG. 3 is a cross-sectional view of the pressure sensor, with the monolithic body housed in a package.

As shown in FIG. 3, the input device described in the aforementioned patent application further comprises a package 15, made, for example, of ceramic material, which encloses the pressure sensor 1.

In detail, the pressure sensor 1 is arranged in an internal chamber 16 of the package 15, in particular, it is bonded to a bottom internal surface of the chamber 16 via a layer of adhesive material 17. The internal chamber 16 is filled with a coating gel 18, and is closed at the top by a membrane 19 made of flexible plastic material, which further delimits a main top surface of the package 15. The electrical connection between the pads 6 and the outside of the package 15 is made via metal leads 20, connected to the pads 6, inside the package 15, by means of wires 21. The metal leads 20 are moreover connected to a printed-circuit board (PCB) 22, provided on which are the electronic detection circuit of the input device, and, conveniently, the electronic control circuit of the mobile phone (typically comprising at least one microprocessor circuit).

The membrane 19 and the coating gel 18 constitute an interface between the control element of the input device (for example comprising a set of keys—not shown—arranged on top of the membrane 19) and the sensitive elements 4, and enable transfer of the pressure deriving from actuation of the control element to the diaphragms 9 of the sensitive elements 4. Said pressure brings about a deformation of the diaphragms 9, a variation in the resistivity of the respective piezoresistive elements 10, and, consequently, an unbalancing of the corresponding Wheatstone-bridge circuits, which is detected by the electronic interface circuit 5. In detail, the sensitive element 4 corresponding to the direction of actuation of the control element undergoes a maximum deformation. The electronic detection circuit receives the output signals from the electronic interface circuit 5, detects the information of direction and intensity of actuation, and transmits it to the electronic control circuit of the mobile phone, which generates the corresponding action within the graphic interface. In particular, the direction of the actuation is determined on the basis of the relation existing between the various signals received (in particular, the direction corresponding to the sensitive element 4 that has undergone the largest deformation is determined).

Advantageously, the speed of the action generated within the interface is a function of the intensity of actuation of the control element (i.e., it varies in an analog manner with the intensity of actuation). In fact, the greater the intensity of actuation, the greater the deformation of the diaphragm 9 of the corresponding sensitive element 4, the unbalancing of the Wheatstone bridge, and, consequently, the output signals that are sent to the electronic detection circuit.

The input device described is not, however, optimized in terms of costs and area occupation, in particular as regards assembly of the pressure sensor 1 on the printed circuit board 22. Consequently, the input device is not particularly suited to integration in portable apparatuses, such as mobile phones.

Figure 4:
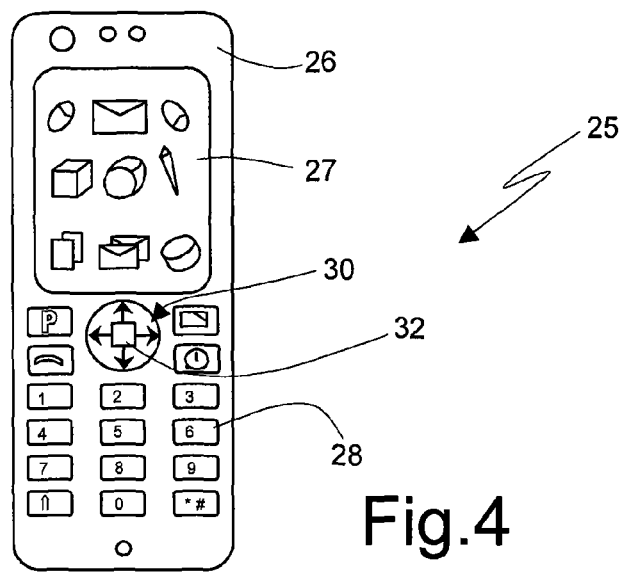
FIG. 4 shows a portable apparatus, in particular a mobile phone, comprising an input device.

As shown in FIG. 4, an electronic apparatus, in particular a mobile phone 25, comprises an outer casing 26, which houses a display screen 27, a plurality of function keys 28, and an input device 30. In a known way, the function keys 28 enable standard functions of the mobile phone 25 to be performed, such as, for example, dialing of phone numbers or entry of text messages, and a graphic interface is displayed on the display screen 27, said interface being made up of a plurality of icons, with a given function (or set of functions) of the mobile phone 25 corresponding to each of the icons. The input device 30 is, for example, arranged in a central portion of the body of the mobile phone 25, in the proximity of the display screen 27, and enables a user to interact with the graphic interface. In particular, the input device 30 enables entry of data and/or commands; for instance, it enables: generation of actions of displacement within the graphic interface and selection and activation of particular mobile phone functions 25, or control of the movement of a cursor (not illustrated) displayed on the display screen 27 in given operating conditions of the mobile phone 25.

Figure 5:
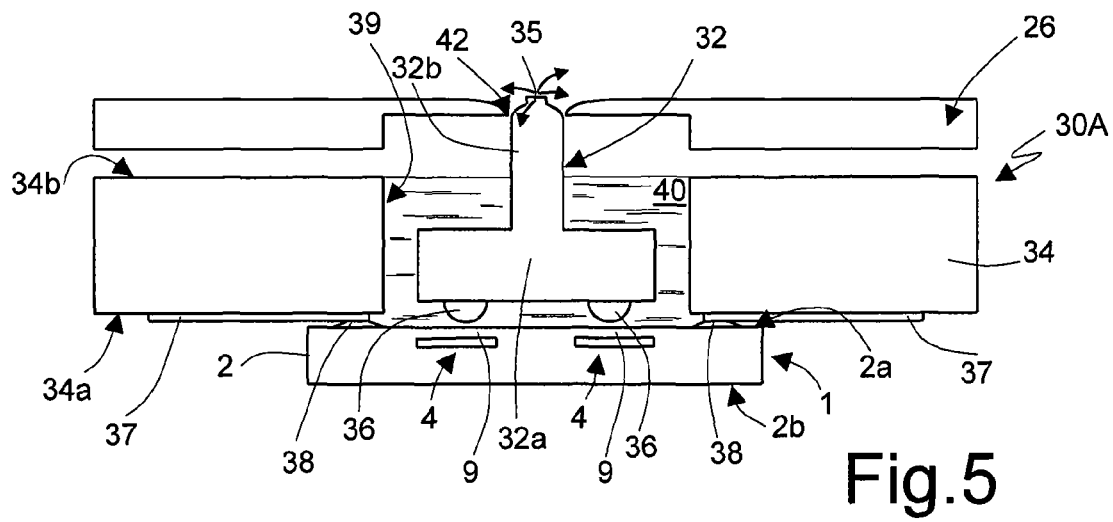
FIG. 5 is a cross-sectional view of the input device of FIG. 4, according to one embodiment of the present invention.

In detail (see also FIG. 5), the input device 30 in one embodiment is an input device 30A that comprises: a control element 32, which can be actuated by a user; a pressure sensor 1, mechanically coupled to the control element 32 for detecting its actuation and generating corresponding electrical signals; and a supporting element, in particular a printed circuit board 34, which is connected to the pressure sensor 1 and integrates an electronic detection circuit, configured to receive the aforesaid electrical signals and determine the direction and intensity of actuation of the control element 32. Advantageously, the printed circuit board 34 further integrates an electronic control circuit of the mobile phone 25.

The pressure sensor 1 (shown schematically in FIG. 5 and in the subsequent figures) is formed as described with reference to FIGS. 1-2, so that parts that are similar are designated by the same reference numbers. In particular, the pressure sensor 1 is arranged so as to undergo mechanical deformations due to actuation of the control element 32.

The control element 32 can be operated manually by a user in a plurality of actuation directions, for example, in four directions corresponding to the directions of displacement "North", "South", "East", and "West" (indicated by the arrows), associated to which are corresponding directions of displacement within the graphic interface. In detail, the control element 32 has substantially the shape of a "T" turned upside down, and comprises a base body 32a and an elongated body 32b, joined to the base body 32a. The elongated body 32b extends in a direction perpendicular to the base body 32a and has a tapered shape, ending in an actuation element 35. The base body 32a carries underneath (on the opposite side with respect to the elongated body 32b) a plurality of pressure elements 36. In particular, the pressure elements 36 are rigidly coupled to the base body 32a and have a hemispherical shape. In addition, the number of pressure elements 36 is equal to the number of actuation directions of the control element 32, or, in an equivalent way, to the number of sensitive elements 4.

The printed circuit board 34 is conveniently of the double-face type (i.e., contact metallizations are provided on both of the main faces) and has a first main face 34a and a second main face 34b, opposite to one another and separated by a thickness of, for example, 3 mm. In particular, conductive paths 37, made, for example, of copper, are provided on the first main face 34a.

According to one embodiment of the present invention, assembly of the monolithic body 2 to the printed circuit board 34 occurs without interposition of a package.

In detail, according to one embodiment of the present invention, the printed circuit board 34 has a through opening 39, which traverses the entire thickness of the printed circuit board 34, starting from the first main face 34a as far as the second main face 34b.

The monolithic body 2 is arranged underneath the printed circuit board 34, in such a manner that the first main outer surface 2a faces the first main face 34a of the printed circuit board 34, and the diaphragms 9 of the sensitive elements 4 are set in a position corresponding to, and face, the through opening 39. The second main face 34b of the printed circuit board 34, instead, faces an internal portion of the outer casing 26 of the mobile phone 25. Conductive bumps 38, made with the so-called "screen-printing" technique, are in electrical contact with, and arranged between, the connection pads 6 carried by the first main outer surface 2a and the conductive paths 37, and provide electrical and mechanical connection between the pressure sensor 1, in particular the electronic interface circuit 5, and the electronic detection circuit integrated in the printed circuit board 34. Said connection is made using the so-called "flip-chip" technique, in particular without the use of bonding wires.

A protective material 40 fills, advantageously in a complete way, the through opening 39 and coats the portion of the first main surface 2a facing the through opening 39, and in particular the diaphragms 9. The protective material 40 is an elastomer having a low Young's modulus, for example, a silicone gel, such as Fluorogel™ Q3-6679 produced by the company Dow Corning™, and has the function of protecting the sensitive elements 4 from the outside environment and from the direct pressure exerted by the user, which could cause damage thereto.

The control element 32 is arranged within the through opening 39, in such a manner that the base body 32a and part of the elongated body 32b are embedded in the protective material 40. The pressure elements 36 are each arranged in a position corresponding to, and facing, a respective diaphragm 9. In addition, the actuation element 35 projects out of a window 42 made in the outer casing 26 of the mobile phone 25, so as to be accessible to the user. The protective material 40 has mechanical characteristics to keep the control element 32 in a stable resting position, and at the same time to enable its displacement following upon actuation by the user. In addition, the protective material 40 has a degree of elasticity so that the control element 32 will assume the resting position again, once actuation has ceased.

During operation, the user displaces the actuation element 35 in one of the actuation directions allowed for the control element 32, causing a corresponding displacement of the base body 32a within the protective material 40. Consequently, one of the pressure elements 36, in particular the one corresponding to the direction of actuation, exerts a pressure on the corresponding diaphragm 9, causing its deformation.

Figure 6:
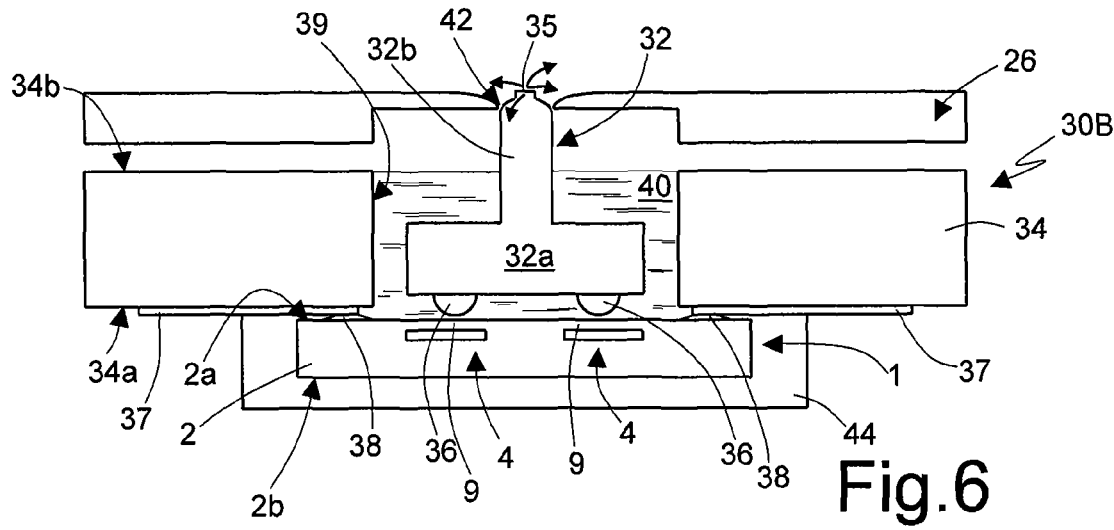
FIG. 6 is a cross-sectional view of the input device of FIG. 4, according to one embodiment of the present invention.

One embodiment of the present invention, the input device 30 is an input device 30B (see FIG. 6) in which the monolithic body 2 is housed in a protective region 44, for example, made of resin (commonly referred to as "globe top"). In detail, the monolithic body 2 is fully in contact with the protective region 44 except in the portion of the main outer surface 2a arranged in a position corresponding to the through opening 39 (where it is, instead, in contact with the protective material 40). The protective region 44 has the function of preventing movement of the monolithic body 2 and of protecting it from external stresses.

Figure 7:
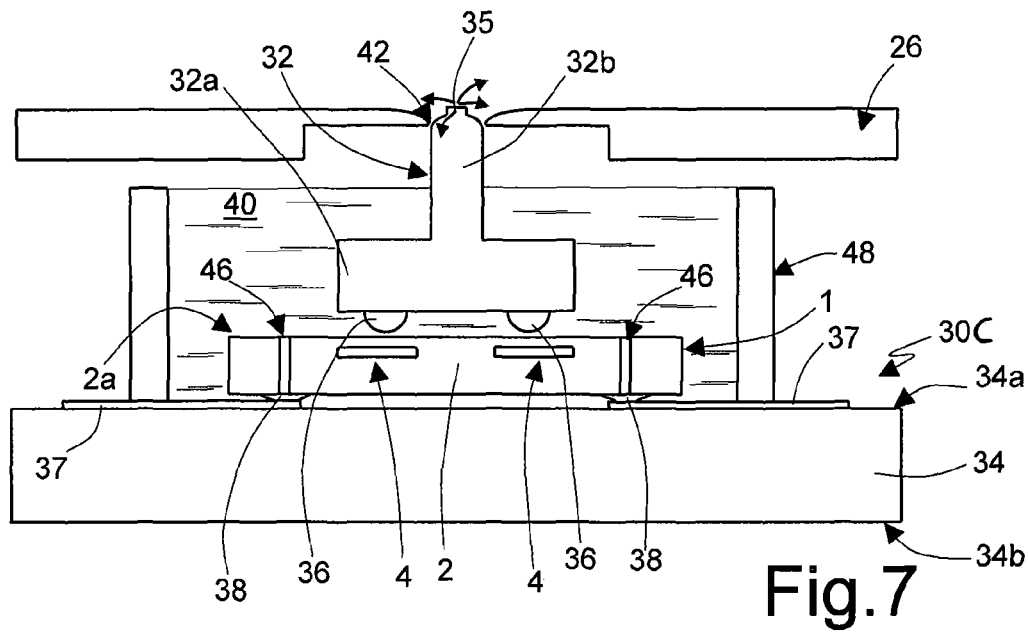
FIG. 7 is a cross-sectional view of the input device of FIG. 4, according to one embodiment of the present invention.

According to a different embodiment of the present invention (illustrated in FIG. 7), the input device 30 is an input device 30C in which through connections 46 are provided through the monolithic body 2, said connections being electrically connected to the connection pads 6 carried by the first main outer surface 2a. The through connections 46 can be made using any known technique, for example, by means of metallized through holes (vias), or using the technique described in U.S. Pat. Nos. 6,504,253 and 6,838,362, both of which are assigned to STMicroelectronics Srl and incorporated herein by reference.

In this case, the printed circuit board 34 has a solid and continuous structure (in particular, it does not have the through opening 39), and is arranged in such a manner that the first main face 34a faces the outer casing 26 of the mobile phone 25. The monolithic body 2 is set on top of the first main face 34a, and the conductive bumps 38 are in electrical contact with, and arranged between, the through connections 46 and the conductive paths 37 carried by the first main face 34a.

A containment structure 48, hollow and open at the top and the bottom, for example, having a cylindrical shape and being made of metal or plastic material, is set in contact with the first main face 34a and surrounds the monolithic body 2, enclosing it. Also in this case, the protective material 40 is provided for coating and protecting the monolithic body 2. The protective material 40 is contained laterally by the containment structure 48, and, advantageously, is at the same level as the top end (i.e., the end opposite to that in contact with the printed circuit board 34) of the containment structure 48.

The control element 32 is arranged, at least partially, within the containment structure 48 so that the base body 32a and part of the elongated body 32b are immersed in the protective material 40 and supported thereby in the resting position. Once again, the actuation element 35 projects from the window 42 made in the outer casing 26 of the mobile phone 25 so as to be accessible to the user.

The advantages of the input devices shown in the figures are clear from the above description.

It is emphasized, however, that the described assembly of the monolithic body 2 of the pressure sensor 1 and of the printed circuit board 34 of the input device 30 involves a smaller thickness and area occupation, and a complexity of fabrication that is considerably lower than that of traditional solutions, thus rendering the input device 30 particularly suited for use in portable electronic apparatuses. In particular, the described assembly does not envisage the use either of a package or of bonding wires, which are notoriously weak as regards mechanical stresses. In fact, it is not necessary to provide a special wiring between the pressure sensor 1 and the electronic detection circuit, in so far as the electrical connection is ensured by the conductive bumps 38. Consequently, the input device 30 has a greater mechanical resistance to failure as compared to traditional devices.

Finally, it is clear that modifications and variations may be made to the input device described and illustrated herein, without thereby departing from the scope of the present invention, as defined in the annexed claims.

The electronic detection circuit can be integrated in the monolithic body 2, together with the electronic interface circuit 5. In this case, in the printed circuit board 34, electrical connections to the electronic control circuit of the mobile phone 25 are in any case provided (as has been said, also said control circuit is conveniently integrated in the printed circuit board 34). In addition, the electronic detection circuit can be integrated in the electronic control circuit of the mobile phone 25.

As will be clear to a person skilled in the art, the shape and structure of the control element 32 may be different. For example, the control element 32 can include keys, or generic pressure areas, arranged on top of a membrane made in the casing 26 of the mobile phone 25 in a position corresponding to the through opening 39, or on top of the containment structure 48. Operation of the keys in this case causes a deformation of the underlying membrane, which is transmitted from the protective material 40 to the diaphragms 9, causing their deformation.

In addition, a different number of sensitive elements 4 may be provided. For example, the pressure sensor 1 could comprise a further sensitive element (for a total of five sensitive elements), which is arranged at the centre of the cross formed by the other sensitive elements 4 and has the function of generating operations of selection, or else of enlargement of an image displayed on the display screen 27. Alternatively, a total of nine sensitive elements 4 may be provided arranged in a regular way in a matrix array of three rows and three columns, in order to be able to generate displacements also diagonally within the graphic interface, and as a whole in the directions: "North", "South", "East", "West", "North-East", "North-West", "South-East", and "South-West".

Each of the sensitive elements 4 could be integrated within a respective semiconductor die, possibly with a corresponding electronic interface circuit. In this case, the various dies could be assembled to the printed circuit board 34 in a way similar to what has been described, using conductive bumps 38 provided between the connection pads of the individual dies and the conductive paths 37.

Furthermore, within the diaphragms 9 of the sensitive elements 4 transduction elements of a capacitive, instead of resistive, type could be formed.

Finally, the described input device can advantageously be used in any portable electronic apparatus equipped with a display screen and a graphic interface to interact with, for example in a portable personal computer, in a PDA, in a videogame console, or in a remote control.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. An input device, comprising:
   a control element which can be actuated by a user;
   a pressure sensor mechanically coupled to said control element and provided with a monolithic body of semiconductor material having a first sensitive element configured to detect an actuation of said control element and electrical-contact areas on a first main surface thereof;
   a supporting element connected to said monolithic body and having conductive regions on a main face thereof and a through opening; and
   connection elements connecting said monolithic body to said supporting element, wherein said connection elements connect said monolithic body to said supporting element without a package positioned between the monolithic body and the supporting element and said first main surface of said monolithic body is arranged at least partially in a position corresponding to, and facing, said through opening.

2. The device according to claim 1, wherein said connection elements comprise conductive bumps which electrically connect said electrical-contact areas to said conductive regions; said supporting element being a printed circuit board.

3. The device according to claim 2, wherein said first main surface is at least partially in contact with a protective material, configured to transmit a pressure deriving from actuation of said control element to said first sensitive element; said protective material being an elastomeric material, in particular a silicone gel.

4. The device according to claim 3, wherein said control element is embedded at least partially in said protective material and includes at least a pressure element arranged in a position facing said first sensitive element; said pressure element being configured to exert pressure on said sensitive element following actuation of said control element.

5. The device according to claim 3, wherein said connection elements are arranged in contact between said electrical-contact areas and said conductive regions.

6. The device according to claim 3 wherein said through opening contains said protective material.

7. The device according to claim 5, wherein said monolithic body is housed in a globe-top protective region.

8. The device according to claim 1, wherein said first sensitive element comprises: a cavity contained and insulated within said monolithic body; a diaphragm formed in a portion of the first main surface of said monolithic body and suspended above said cavity; and transduction elements configured to detect deformations of said diaphragm following actuation of said control element.

9. The device according to claim 1, wherein said monolithic body houses further sensitive elements; each of said first sensitive element and further sensitive elements preferentially detecting a respective direction of actuation of said control element.

10. A process for manufacturing an input device provided with a control element which can be actuated by a user and with a supporting element, the process comprising:
forming in a monolithic body of semiconductor material a first sensitive element configured to detect an actuation of said control element, said monolithic body having electrical contact areas on a first main surface;
mechanically coupling the first main surface of said monolithic body to said control element; and
connecting said monolithic body to said supporting element, wherein said supporting element has conductive regions on a main face thereof and a through opening and connecting said monolithic body to said supporting element comprises connecting said first main surface of said monolithic body to said main face of the supporting element without positioning a package between the monolithic body and the supporting element and with the first main surface of the monolithic body aligned with and facing the through opening.

11. The process according to claim 10, wherein:
said supporting element is a printed circuit board; and
connecting said monolithic body to said supporting element comprises electrically connecting said electrical-contact areas to said conductive regions through connection elements comprising conductive bumps.

12. The process according to claim 11, wherein mechanical coupling comprises:
arranging said first main surface at least partially in contact with a protective material, in particular an elastomeric material, configured to transmit a pressure deriving from actuation of said control element to said first sensitive element; and
arranging said control element at least partially within said protective material in a position facing said first sensitive element, said control element carrying at least one pressure element configured to exert pressure on said sensitive element following actuation of said control element.

13. The process according to claim 11, wherein connecting said monolithic body to said supporting element comprises arranging in contact said connection elements between said electrical-contact areas and said conductive regions.

14. The process according to claim 10, wherein forming a first sensitive element comprises: forming a cavity contained and insulated within said monolithic body; forming a diaphragm in the first main surface of said monolithic body suspended above said cavity; and forming transduction elements, which detect deformations of said diaphragm following upon actuation of said control element.

15. An electronic apparatus comprising:
an input device including:
a control element which can be actuated by a user;
a pressure sensor mechanically coupled to said control element and provided with a monolithic body of semiconductor material having a first sensitive element configured to detect an actuation of said control element and electrical contact areas on a first surface;
a supporting element connected to said monolithic body, said supporting element having conductive regions on a first face thereof and a through opening; and
connection elements that connect said monolithic body to said supporting element without a package positioned between the monolithic body and the supporting element and with the first surface of the monolithic body directly bonded to the first face of the support element with the first sensitive element aligned with and facing the through opening.

16. The apparatus according to claim 15, chosen in the group comprising mobile phones, PDAs, personal computers, videogame consoles, and remote controls.

17. The apparatus according to claim 15, wherein said connection elements comprise conductive bumps which electrically connect said electrical-contact areas to said conductive regions; said supporting element being a printed circuit board.

18. The apparatus according to claim 17, wherein said first surface is at least partially in contact with a protective material, configured to transmit a pressure deriving from actuation of said control element to said first sensitive element; said protective material being an elastomeric material.

19. The apparatus according to claim 18, wherein said control element is embedded at least partially in said protective material and includes at least a pressure element arranged in a position facing said first sensitive element; said pressure element being configured to exert pressure on said sensitive element following actuation of said control element.

20. The apparatus according to claim 18 wherein said through opening contains said protective material.

21. The apparatus according to claim 20 wherein said monolithic body is housed in a globe-top protective region.

22. The apparatus according to claim 15, wherein said first sensitive element comprises: a cavity contained and insulated within said monolithic body; a diaphragm formed in a portion of the first surface of said monolithic body and suspended above said cavity; and transduction elements configured to detect deformations of said diaphragm following actuation of said control element.

23. An input device, comprising:
a control element which can be actuated by a user;
an actuation sensor that includes a monolithic body of semiconductor material having a first sensitive element configured to detect an actuation of the control element;
a supporting element connected to and supporting the monolithic body; and
connection elements electrically connecting the actuation sensor to the supporting element, the connection elements extending from a first face of the actuation sensor to a face of the supporting element, the first face of the actuation sensor facing the face of the supporting element, wherein the supporting element has a through opening, the control element extends in the through opening, and the first face of the actuation sensor at least partially faces the through opening.

24. The device according to claim 23, wherein the first face of the actuation sensor has electrical-contact areas, the first face of the supporting element has conductive regions, and the connection elements comprise conductive bumps that electrically connect the electrical-contact areas to the conductive regions; the supporting element being a printed circuit board.

25. The device according to claim 24, further comprising a protective material configured to transmit a pressure deriving from actuation of the control element to the first sensitive element, the protective material being in contact with the supporting element and the actuation sensor; the protective material being an elastomeric material.

26. The device according to claim 25, wherein the control element is embedded at least partially in the protective material and includes at least a pressure element arranged in a position facing the first sensitive element; the pressure element being configured to exert pressure on the sensitive element following actuation of the control element.

27. The device according to claim 23, further comprising a globe-top protective region that houses the monolithic body.

28. The device according to claim 23, wherein the first sensitive element comprises: a cavity contained and insulated within the monolithic body; a diaphragm formed in a surface portion of the first face of the monolithic body and suspended above the cavity; and transduction elements configured to detect deformations of the diaphragm following actuation of the control element.

29. An input device, comprising:
a circuit board having an opening extending from a first face of the circuit board through to a second face of the circuit board;
a monolithic semiconductor body having a sensitive element on a first face, the first face of the monolithic semiconductor body directly bonded to the second face of the circuit board by conductive bumps bonded to connection pads, with the sensitive element aligned with and facing the opening in the circuit board; and
a control element positioned in the opening in the circuit board.

30. The input device of claim 29, further comprising a protective material in the opening of the circuit board, the protective material coating the sensitive element on the first surface of the monolithic semiconductor body.

31. The input device of claim 30 wherein the control element is at least partially embedded in the protective material.

32. The input device of claim 29 wherein the conductive bumps are on the first face of the monolithic semiconductor body and the connection pads are on the second face of the circuit board.

33. The input device of claim 29, further comprising a protective resin coating a second surface of the monolithic semiconductor body, opposite of the first surface of the monolithic semiconductor body, side surfaces of the monolithic semiconductor body and at least a portion of the second surface of the circuit board.

34. The input device of claim 29 wherein conductive bumps on the first face of the monolithic semiconductor body are bonded to connection pads on the second face of the circuit board and the input device further comprises:
a protective material in the opening in the circuit board, wherein the protective material coats the sensitive element on the first face of the monolithic semiconductor body and the control element is at least partially embedded in the protective material; and
a protective resin coating a second surface of the monolithic semiconductor body, opposite of the first surface of the monolithic semiconductor body, side surfaces of the monolithic semiconductor body and at least a portion of the second surface of the circuit board.

* * * * *